US008412531B2

(12) United States Patent
Sullivan et al.

(10) Patent No.: US 8,412,531 B2
(45) Date of Patent: Apr. 2, 2013

(54) TOUCH ANYWHERE TO SPEAK (75) Inventors: Anne K. Sullivan, San Francisco, CA (US); Lisa Stifelman, Palo Alto, CA (US); Kathleen J. Lee, San Francisco, CA (US); Su Chuin Leong, South San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 12/482,429

(22) Filed: Jun. 10, 2009

(65) Prior Publication Data
US 2010/0318366 A1 Dec. 16, 2010

(51) Int. Cl.
*G10L 21/00* (2006.01)
(52) U.S. Cl. ............... 704/275; 709/224; 705/14.64; 704/276; 704/235; 463/36; 455/556.1; 455/550.1; 382/114; 345/156
(58) Field of Classification Search .......... 715/234, 715/243, 254, 255; 709/224; 705/14.64; 704/276, 275, 235; 463/36; 455/556.1, 550.1; 382/114; 345/156
See application file for complete search history.

(56) References Cited

U.S. PATENT DOCUMENTS

| 6,115,482 A * | 9/2000 | Sears et al. .............. 382/114 |
| 6,232,957 B1 * | 5/2001 | Hinckley .............. 345/156 |
| 6,233,560 B1 | 5/2001 | Tannenbaum |
| 6,792,287 B1 * | 9/2004 | Tuomela et al. .......... 455/556.1 |
| 8,195,220 B2 * | 6/2012 | Kim et al. .............. 455/550.1 |
| 2002/0032567 A1 | 3/2002 | Lindholm et al. .......... 704/246 |
| 2002/0120455 A1 * | 8/2002 | Nakata .............. 704/275 |
| 2003/0009330 A1 | 1/2003 | Cho .............. 704/235 |
| 2005/0064936 A1 * | 3/2005 | Pryor .............. 463/36 |
| 2005/0171664 A1 | 8/2005 | Konig .............. 701/36 |
| 2005/0197843 A1 * | 9/2005 | Faisman et al. .......... 704/276 |
| 2005/0198265 A1 * | 9/2005 | Veprek et al. .......... 709/224 |
| 2005/0283475 A1 | 12/2005 | Beranek et al. |
| 2007/0112571 A1 | 5/2007 | Thirugnana .............. 704/270 |
| 2008/0109222 A1 | 5/2008 | Liu |
| 2008/0317219 A1 | 12/2008 | Manzardo |
| 2009/0192898 A1 * | 7/2009 | Baril .............. 705/14 |
| 2009/0216531 A1 * | 8/2009 | Yanagihara .............. 704/235 |

FOREIGN PATENT DOCUMENTS

| KR | 2007-0098904 A | 10/2007 |
| WO | WO 2006/013518 A2 | 2/2006 |
| WO | WO 2007/073798 A1 | 7/2007 |

OTHER PUBLICATIONS

International Search Report issued Jan. 27, 2011 in PCT/US2010/038213 filed Jun. 10, 2010.

(Continued)

Primary Examiner — Michael Colucci
(74) Attorney, Agent, or Firm — Merchant & Gould (57) ABSTRACT

The present invention provides a user interface for providing press-to-talk-interaction via utilization of a touch-anywhere-to-speak module on a mobile computing device. Upon receiving an indication of a touch anywhere on the screen of a touch screen interface, the touch-anywhere-to-speak module activates the listening mechanism of a speech recognition module to accept audible user input and displays dynamic visual feedback of a measured sound level of the received audible input. The touch-anywhere-to-speak module may also provide a user a convenient and more accurate speech recognition experience by utilizing and applying the data relative to a context of the touch (e.g., relative location on the visual interface) in correlation with the spoken audible input.

20 Claims, 7 Drawing Sheets

OTHER PUBLICATIONS

Billinghurst, M., "Put That Where? Voice and Gesture at the Graphics Interface," *SIGGRAPH Computer Graphics Newsletter—Interaction in 3D Graphics*, vol. 32 No. 4, 13 pages (Nov. 1998).

Jain, T. et al., "Unified Multiple Media Interface for Robot Teleoperation," *2000 IEEE International Conference on Multimedia and Expo*, pp. 199-202 (2000).

Lemon, O., "Context-sensitive speech recognition in ISU dialogue systems: results for the grammar switching approach," *The 8th Workshop on the Semantics and Pragmatics of Dialogue*, 7 pages (Jul. 19-21, 2004).

Michaud, T. et al., "Speak-n-See," *Proceedings of the IEEE 26th Annual Northeast Bioengineering Conference*, pp. 157-158 (2000).

Tedeschi, B., "Don't Make Your Fingers Do the Work. Talk to Your Cellphone," *New York Times*, 4 pages (Sep. 24, 2008).

Pui-Yu Hui et al., Joint Interpretation of Input Speech and Pen Gestures for Multimodal Human-Computer Interaction, Human-Computer Communications Laboratory, the Chinese University of Hong Kong. Sep. 2006.

Makayama, Voice Dial for iPhone—advanced speech recognition for the iPhone, archived May 9, 2008. http://web.archive.org/web/20080509201747/http://www.makayama.com/iphonevoicedial.html.

* cited by examiner

TOUCH ANYWHERE TO SPEAK

BACKGROUND OF THE INVENTION

Mobile computing devices, such as mobile phones and personal digital assistants, have become a ubiquitous technology in today's society. Such devices currently provide interfaces that allow a user to interact with various mobile applications through a plurality of input mechanisms (e.g., numeric keypad, QWERTY keypad, touch screen, speech recognition, etc). Recently, there has been a rise of speech recognition technologies for input. With speech recognition, user speech commands are captured as audio files and either processed via an embedded speech recognition module located on the mobile device or transferred over a wireless connection to a server where they are processed. One method of engaging a listening mechanism of a speech recognition module is through a press-to-talk interaction model, which allows a user to signal when the application should start and stop recording via an input mechanism. Many mobile applications use a device's existing hardware key, soft key, or a defined boundary of a button on a touch screen interface as an input mechanism to engage the listening mechanism of a speech recognition module.

Input via soft keys or dedicated hardware interfaces, such as buttons, scroll wheels, etc., can be cumbersome due to a variety of factors not limited to small button sizes, buttons being difficult to identify or reference, and/or users having a blind spot to a button location (e.g., located on the side of a mobile device). Even if a button is identifiable, referenceable, available to a given application, and in an ergonomic location, a user may be engaged in another task (e.g., walking, driving, etc.) that may make it difficult to look at his/her mobile device and/or difficult to target the button. When utilizing a dedicated hardware interface such as a button to commence the listening mode of speech recognition, due to its location on the device, pressing it may cover the microphone which can adversely affect speech recognition performance.

Many mobile computing devices today utilize touch screen interfaces. A touch screen may have selectable graphical objects that correspond to push buttons of traditional telephones, keys of a traditional keyboard, and various mobile tasks. Touch screens and input devices comprising touch screens are sometimes difficult to operate. For example, a user, who uses the tip of his finger to activate the touch screen, may easily touch the active surface area of the touch screen at a position where the user did not intend to activate the touch screen. In many cases, such an unintended activation results in an unintended function being performed.

It is with respect to these and other considerations that the present invention has been made.

SUMMARY OF THE INVENTION

Embodiments of this present invention are directed to providing a user interface on a mobile computing device for providing a maximum amount of target area on a screen to initiate listening of a speech recognition module. According to embodiments, a user may press anywhere on a mobile computing device's touch screen to activate listening in speech recognition interaction. Instead of searching for a hard-to-locate button or pressing a small electrostatic key requiring a user to look at his/her mobile computing device, the entire touch screen is the input mechanism for activating the listening device of a speech recognition module.

According to an embodiment, when a mobile computing device receives an indication of a touch anywhere on its touch screen interface, the listening mechanism is activated and enabled to receive speech input, and an acknowledgement in response to receiving an indication of a touch anywhere on the touch screen interface may be generated to notify a user that the listening mechanism has been activated. According to another embodiment, visual feedback indicating a measured sound level of received speech input may be rendered on the touch screen at the location at which the touch is received.

According to another embodiment of the present invention, context of the display (screen) may also be utilized as an input in addition to speech input to complete an array of tasks. For example, the additional contextual input may aid in narrowing search results to provide the user with an improved speech recognition experience.

These and other features and advantages will be apparent from a reading of the following detailed description and a review of the associated drawings. It is to be understood that both the foregoing general description and the following detailed description are explanatory only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

As briefly described above, embodiments of the present invention are directed to engaging a listening mechanism in speech recognition interaction on a mobile computing device. By pressing on any given area of a screen of a mobile computing device, a touch-anywhere-to-speak (TATS) module activates the listening mechanism of a speech recognition module to accept a user's spoken input so that the speech recognition module may convert the spoken words into machine-readable input. Speech recognition applications may be utilized on mobile computing devices for a variety of tasks including, but not limited to voice dialing (e.g., "Call Bob"), open web search (e.g., "Pizza San Francisco California" to find pizza restaurants in San Francisco), and speech-to-text processing (e.g., text messages and emails).

Many input methods exist for engaging the listening mechanism in speech recognition interaction on a mobile computing device, each possessing its own array of drawbacks and sometimes presenting difficulties outweighing the benefits of using speech recognition. Many users utilize speech recognition because they are using their mobile computing device in a distracted environment (i.e., while walking or driving), making it difficult to look at the screen of their device to perform a task using hardware keys, soft keys, or defined boundaries of a button on a touch screen interface. Embodiments of the present invention utilize the maximum amount of target area on a screen of a mobile computing device to activate the listening mechanism, affording utilization without sight interaction. Initiating listening mode of speech recognition with embodiments of the present invention does not require a user to look at the screen of his/her device to know whether he/she is hitting a particular target area, nor will he/she have to look at or feel around for a tactile button to ensure he/she is pressing the correct button.

When a user presses and holds the screen of a mobile computing device with his/her finger, stylus, or other selection device, a touch anywhere to speak module may give either a visual, audible, or tactile indication, or a combination of the three to indicate that the listening mechanism is activated and the speech recognition module is ready to capture speech input. When an indication that the user is finished with his/her speech input is received, the touch anywhere to speak module may give another indication (visual, audible, or tactile, or a combination of the three) to indicate that the listening mechanism is deactivated. The speech recognition module may either process the data locally on the device or remotely over a wireless connection to a server where it may be processed. The speech recognition application may then receive the recognized output and may then either activate a given application, display given information, or perform a given task that the user has indicated through the speech recognition application.

According to another embodiment, the TATS module may also be implemented as a "layer" above an existing user interface. When implemented as a "layer" above an existing user interface, the TATS module may utilize both context sensitive information of the visual interface in addition to open-ended speech commands to help a user complete an array of tasks. Based on the context of a screen of a mobile device, and/or the location on a screen where a user touches, a determination may be made as to the context of the user's speech input. For example, if a user is viewing a map on his/her mobile computing device, he/she may touch on a specific area of the map interface and speak, "movie theaters." The TATS module may receive the spoken input, "movie theaters", as well as the context-aware location on the map interface where the user touched to retrieve information relevant to movie theaters within a proximity to the geographical area correlated to the touched area of the map interface. For another example, by touching on a picture or a webpage and speaking, "Send to Bob," a user could send the touched object to a recognized contact, Bob.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Figure 1:
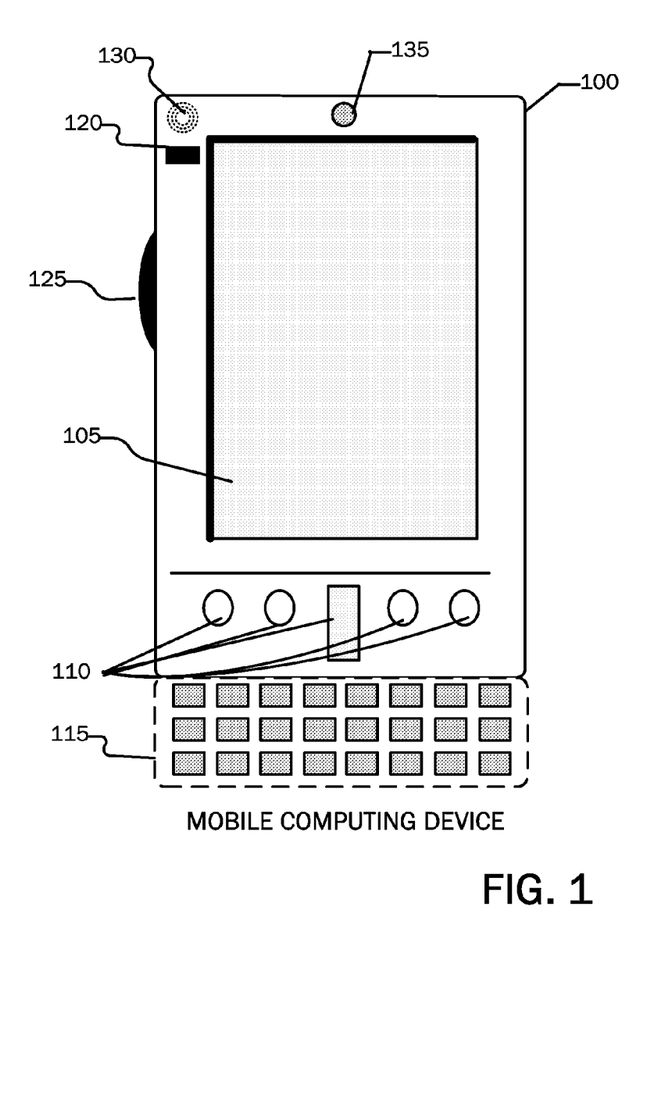
FIG. 1 is a diagram of an example mobile computing device.

The following is a description of a suitable mobile computing device, for example, a mobile phone with which embodiments of the invention may be practiced. With reference to FIG. 1, an example mobile computing device 100 for implementing the embodiments is illustrated. In a basic configuration, mobile computing device 100 is a handheld computer having both input elements and output elements. Input elements may include touch screen display 105 and input buttons 115 that allow the user to enter information into mobile computing device 100. Mobile computing device 100 may also incorporate an optional side input element 125 allowing further user input. Optional side input element 125 may be a rotary switch, a button, or any other type of manual input element. In alternative embodiments, mobile computing device 100 may incorporate more or less input elements. For example, display 105 may not be a touch screen in some embodiments. In yet another alternative embodiment, the mobile computing device is a portable phone system, such as a cellular phone having display 105 and input buttons 115. Mobile computing device 100 may also include an optional keypad 115. Optional keypad 115 may be a physical keypad or a "soft" keypad generated on the touch screen display.

Mobile computing device 100 incorporates output elements, such as display 105, which can display a graphical user interface (GUI). Other output elements include speaker 130 and LED light 120. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

Figure 2:
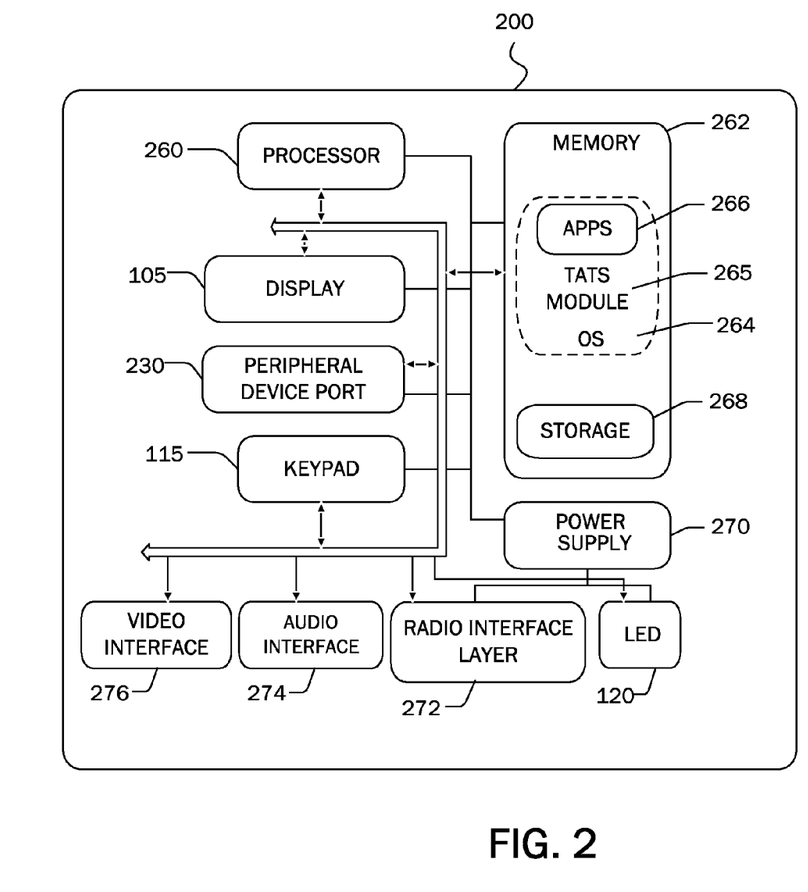
FIG. 2 is a simplified block diagram illustrating components of a mobile computing device that may serve as an exemplary operating environment for embodiments of the present invention.

FIG. 2 is a block diagram illustrating components of a mobile computing device used in one embodiment, such as the computing device shown in FIG. 1. That is, mobile computing device 100 (FIG. 1) can incorporate system 200 to implement some embodiments. For example, system 200 can be used in implementing a "smart phone" that can run one or more applications similar to those of a desktop or notebook computer such as, for example, browser, e-mail, scheduling, instant messaging, and media player applications. System 200 can execute an Operating System (OS) such as, WINDOWS XP®, WINDOWS CE® available from MICROSOFT CORPORATION, Redmond, Wash. In some embodiments, system 200 is integrated as a computing device, such as an integrated personal digital assistant (PDA) and wireless phone.

One or more application programs 266 may be loaded into memory 262 and run on or in association with operating system 264. Examples of application programs include phone dialer programs, e-mail programs, PIM (personal information management) programs, word processing programs, spreadsheet programs, Internet browser programs, messaging programs, and so forth. System 200 also includes non-volatile storage 268 within memory 262. Non-volatile storage 268 may be used to store persistent information that should not be lost if system 200 is powered down. Applications 266 may use and store information in non-volatile storage 268, such as e-mail or other messages used by an e-mail application, and the like. A synchronization application (not shown) also resides on system 200 and is programmed to interact with a corresponding synchronization application resident on a host computer to keep the information stored in non-volatile storage 268 synchronized with corresponding information stored at the host computer. As should be appreciated, other applications may be loaded into memory 262 and run on the device 100.

According to an embodiment, touch-anywhere-to-speak application 265 is operative to activate a listening mechanism of a speech recognition module operative to receive speech information from a user for use in a variety of applications as described below.

System 200 has a power supply 270, which may be implemented as one or more batteries. Power supply 270 might further include an external power source, such as an AC adapter or a powered docking cradle that supplements or recharges the batteries.

System 200 may also include a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 266 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices; LED 120 that can be used to provide visual notifications and an audio interface 274 that can be used with speaker 130 to provide audio notifications. These devices may be directly coupled to power supply 270 so that when activated, they remain on for a duration dictated by the notification mechanism even though processor 260 and other components might shut down for conserving battery power. LED 120 may be programmed to remain on indefinitely until the user takes action to indicate the powered-on status of the device. Audio interface 274 is used to provide audible signals to and receive audible signals from the user. For example, in addition to being coupled to speaker 130, audio interface 274 may also be coupled to a microphone to receive audible input, such as to facilitate a telephone conversation. In accordance with embodiments of the present invention, the microphone may also serve as an audio sensor to facilitate control of notifications, as will be described below.

System 200 may further include video interface 276 that enables an operation of on-board camera 135 to record still images, video stream, and the like.

A mobile computing device implementing system 200 may have additional features or functionality. For example, the device may also include additional data storage devices (removable and/or non-removable) such as, magnetic disks, optical disks, or tape. Such additional storage is illustrated in FIG. 2 by storage 268. Computer storage media may include volatile and nonvolatile, removable and non-removable media implemented in any method or technology for storage of information, such as computer readable instructions, data structures, program modules, or other data.

Data/information generated or captured by the device 100 and stored via the system 200 may be stored locally on the device 100, as described above, or the data may be stored on any number of storage media that may be accessed by the device via the radio 272 or via a wired connection between the device 100 and a separate computing device 330 associated with the device 100, for example, a server computer in a distributed computing network 320 such as the Internet. As should be appreciated such data/information may be accessed via the device 100 via the radio 272 or via a distributed computing network 320. Similarly, such data/information may be readily transferred between computing devices for storage and use according to well-known data/information transfer and storage means, including electronic mail and collaborative data/information sharing systems.

Figure 3:
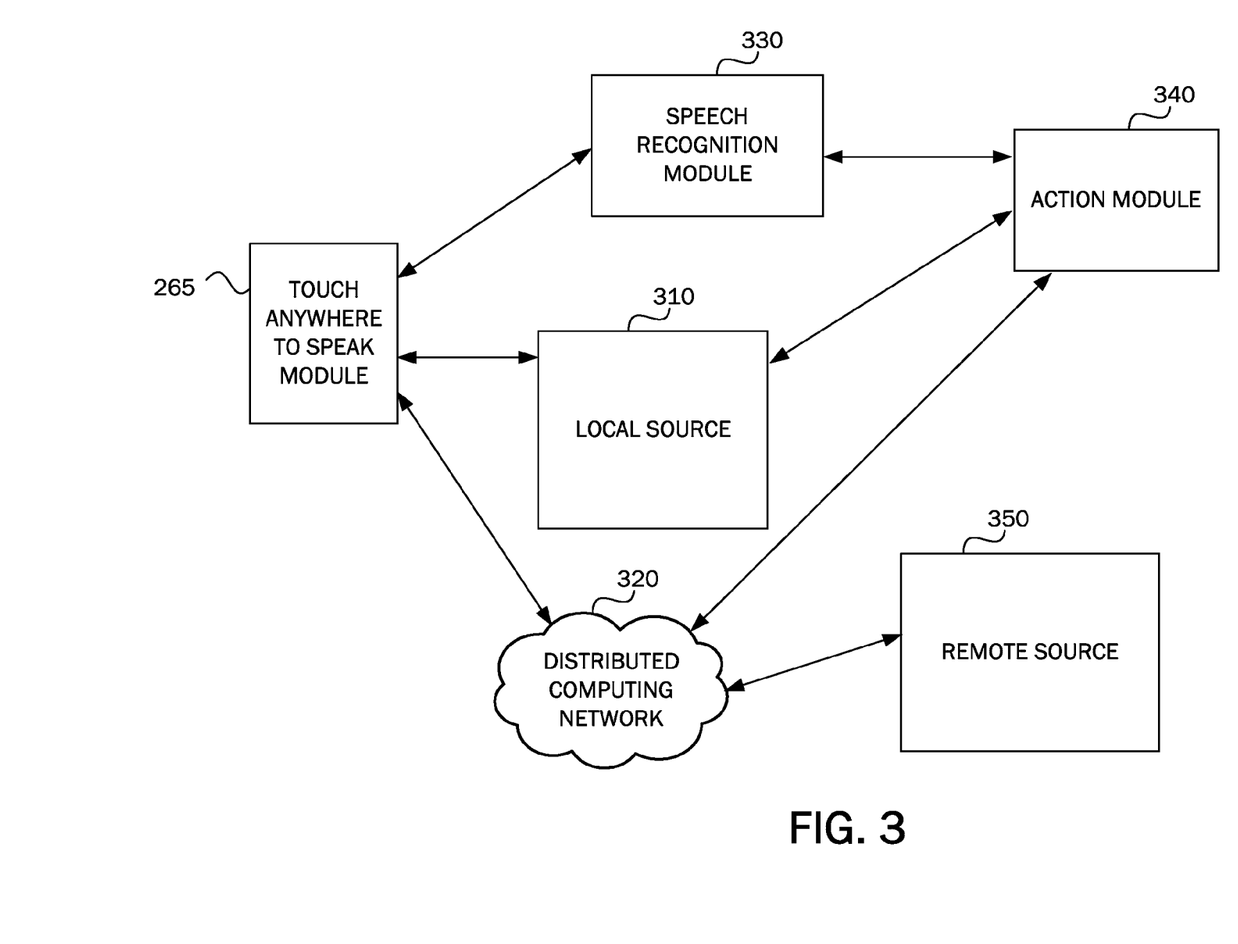
FIG. 3 is a simplified block diagram of a computing architecture for utilizing a touch-anywhere-to-speak module to engage the listening mechanism in speech recognition interaction on a mobile computing device.
Figure 4:
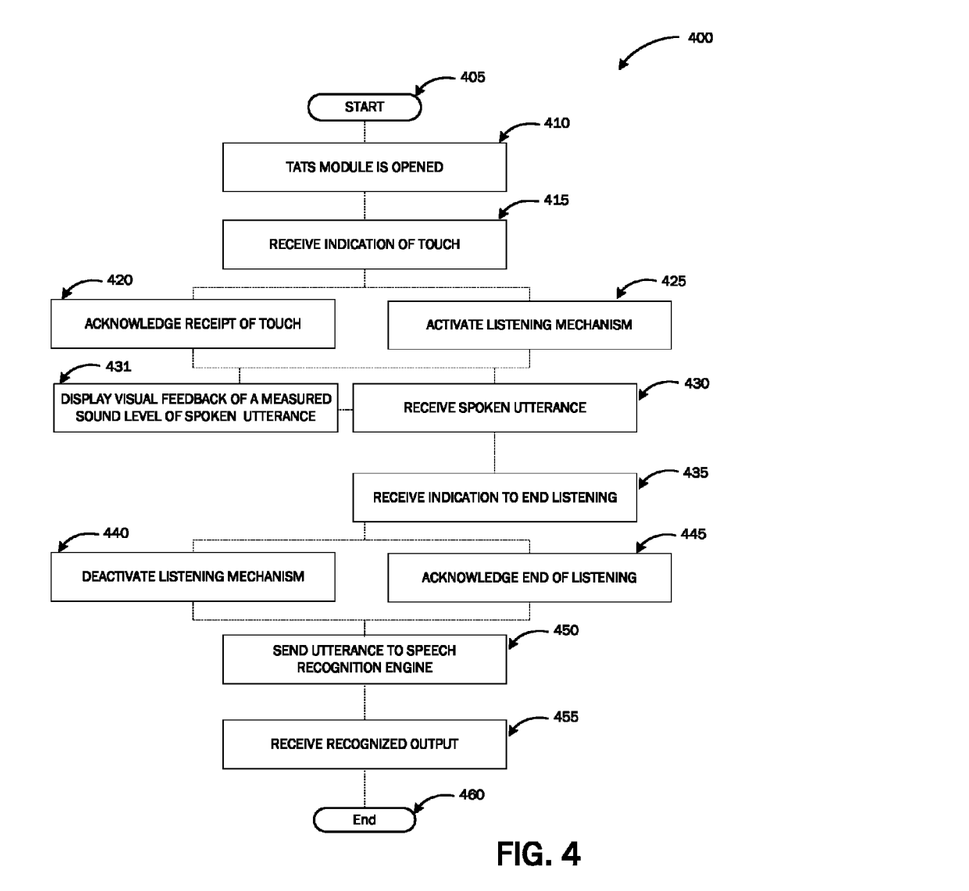
FIG. 4 is a logical flow diagram illustrating a method for engaging the listening mechanism in speech recognition interaction utilizing a touch-anywhere-to-speak module.

FIG. 3 is a simplified block diagram of a computing architecture for utilizing a touch-anywhere-to-speak (TATS) module 265 to initiate listening of a speech recognition module 330 on a mobile computing device 100. According to an embodiment, after an indication of a touch on a screen 105 of a mobile computing device 100 is received by the TATS module 265, a speech recognition process, by which received audible input is recognized, may be accomplished via speech recognition architecture as illustrated in FIG. 4. As should be appreciated, the speech recognition architecture 330 illustrated in FIG. 4 may be integrated with the TATS module 265, or the speech recognition architecture illustrated in FIG. 4 may be called by the TATS module 265 for obtaining recognition of audible input.

According to one embodiment, once given audible input is recognized as a text string, for example, "Pizza New York City" and identified as associated with a given task, for example, web search, an action module 340 may be activated to pass the recognized text string to a local information source 310 or via a distributed computing network 320 to a remote source 350 for retrieval of information applicable to the text string. For example, if the audible input, "Bob" is recognized by the recognition module 330 as a contact in the user's address book or contacts list, then the action module 340 may pass the identified text string to all information sources contained at the local source 310 and/or a remote source 350 via a distributed computing network 320 for obtaining available information associated with the selected text string. According to an embodiment, the action module 340 may provide options to a user to perform a mobile task relating to the recognized contact. Referring again to the example above where a user speaks "Bob" and the input is recognized as a contact in the user's address book, the action module 340 may provide options to the user to perform an action, for example, to place a call, or send an email or an instant message to the recognized contact, Bob.

Information matching the text string from each available source may be returned to the TATS module 265 for provision to a user for subsequent use in a desired software application or mobile task. For example, if the audible input "Bob" was found to match two possible matches, "Bob Smith" and "Bob Davis," then both matching entries may be presented to the user in a user interface displayed on his/her mobile computing device 100 to allow the user to select his/her intended entry. Once the user selects his/her intended entry, then the selected text string may be passed to one or more mobile or software applications as described in more detail below. As should be appreciated, the speech recognition module 330 may be programmed for recognizing many data types, for example, commands, addresses, geographic locations, book titles, movie titles, etc. If options are presented to a user that do not match the user's intended entry, the user may press and hold the screen 105 of the mobile computing device 100 to provide audible input again, or he/she may press outside the area of the displayed matches to avoid having to return to a previous input screen to press and speak.

FIG. 4 is a logical flow diagram illustrating a method for providing a touch-anywhere-to-speak (TATS) module 265 for engaging the listening mechanism in speech recognition interaction on a mobile computing device 100. Having described an exemplary operating environment and aspects of embodiments of the present invention above with respect to FIGS. 1-3, it is advantageous to describe an example operation of an embodiment of the present invention. Referring then to FIG. 4, the method 400 begins at start operation 405 and proceeds to operation 410 where the TATS module 265 is selected and opened by a user. A user may open the TATS module 265 via known input methods, for example, touching on an icon or text string representing the TATS module 265 on the screen 105 of a mobile computing device 100.

After the TATS module 265 is opened, the method proceeds to operation 415 where the TATS module receives an indication of a touch anywhere on the touch screen 105 of a mobile computing device 100. As should be appreciated, a touch may be a touch of a user's finger or by means of a device, such as a stylus. According to embodiments of the invention, the received touch is the method by which the listening mode is enabled in speech recognition interaction. That is, embodiments of the present invention enable a user to touch anywhere on the touch sensitive screen 105 of the device 100 to indicate to the speech recognition module to begin listening for audible input. Embodiments of the present invention allow for a user to touch anywhere on the screen 105 of the device 100 to engage the listening mechanism, as opposed to push-to-talk interaction via an alternate input method such as a hardwired side input element 125, which may be a rotary switch, a button, or any other type of manual input element, hardware input buttons 115, soft keys, defined boundaries of a button on a touch screen interface 105, or other known input elements.

According to an embodiment, a touch may be a component of a press-and-hold interaction model, where a user touches the screen 105 to activate listening, keeps his/her finger (or other mechanism utilized for the touch screen interface) on the screen while he/she is providing audible input, and then releases his/her finger or other touch mechanism to deactivate listening. According to another embodiment, a touch may be a press-and-release interaction model, which like in the previous model, a user touches the screen 105 to activate listening; however, upon releasing his/her finger or other touch mechanism, the speech recognition application 330 remains in listening mode. The listening mechanism may be deactivated via an indication of a subsequent touch, if silence is determined for a given amount of time, or via another method by which an indication of end of speech is detectable by a given application.

Figure 5:
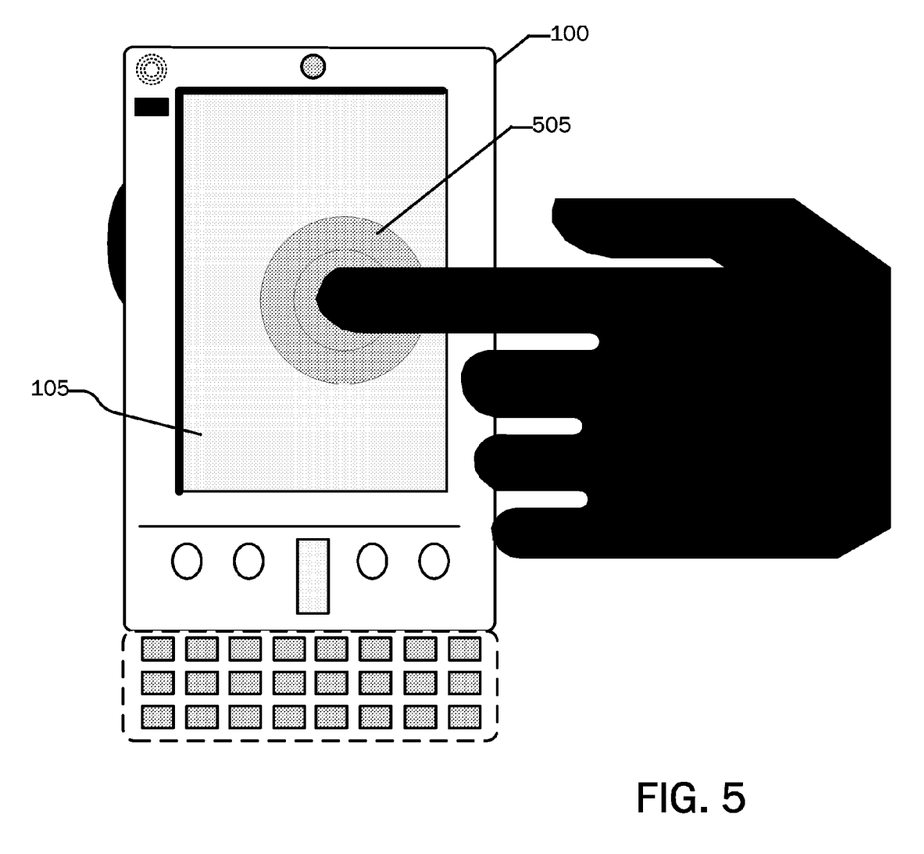
FIG. 5 is an illustration of example visual feedback provided by a touch-anywhere-to-speak module.

After an indication of a touch is received by the TATS module 265, at operation 420, feedback may be given to acknowledge the receipt of the touch. According to an embodiment and as illustrated in FIG. 5, in association with FIG. 4, the feedback 505 may be visual feedback (e.g., animated display on screen 105), audible feedback (e.g., played audible tone through speaker 130), tactile feedback (e.g., vibration), or a combination of the three. According to an embodiment, the visual feedback 505 may indicate where on the screen 105 the user has touched. For example, as illustrated in FIG. 5, an image 505 may be displayed on the screen 105 to alert the user that an indication of a touch has been received in the location where the image is displayed. The feedback may alert the user that the TATS module 265 has received a touch input, and accordingly, the listening mechanism has been activated as shown at operation 425 as illustrated in FIG. 4. According to one embodiment, the TATS module 265 may send feedback acknowledging the receipt of a touch to the user (operation 420) and activate the listening mechanism (operation 425) simultaneously. According to another embodiment, operation 420 may occur before operation 425. According to another embodiment, operation 425 may occur before operation 420.

Once the listening mechanism is activated, the speech recognition module 330 is ready to receive audible input from the user. At operation 430, the user may speak, and his/her spoken utterance may be received by the listening mechanism. As should be appreciated by those skilled in the art, speech recognition is a known technology that will not be discussed at length herein.

Figure 6:
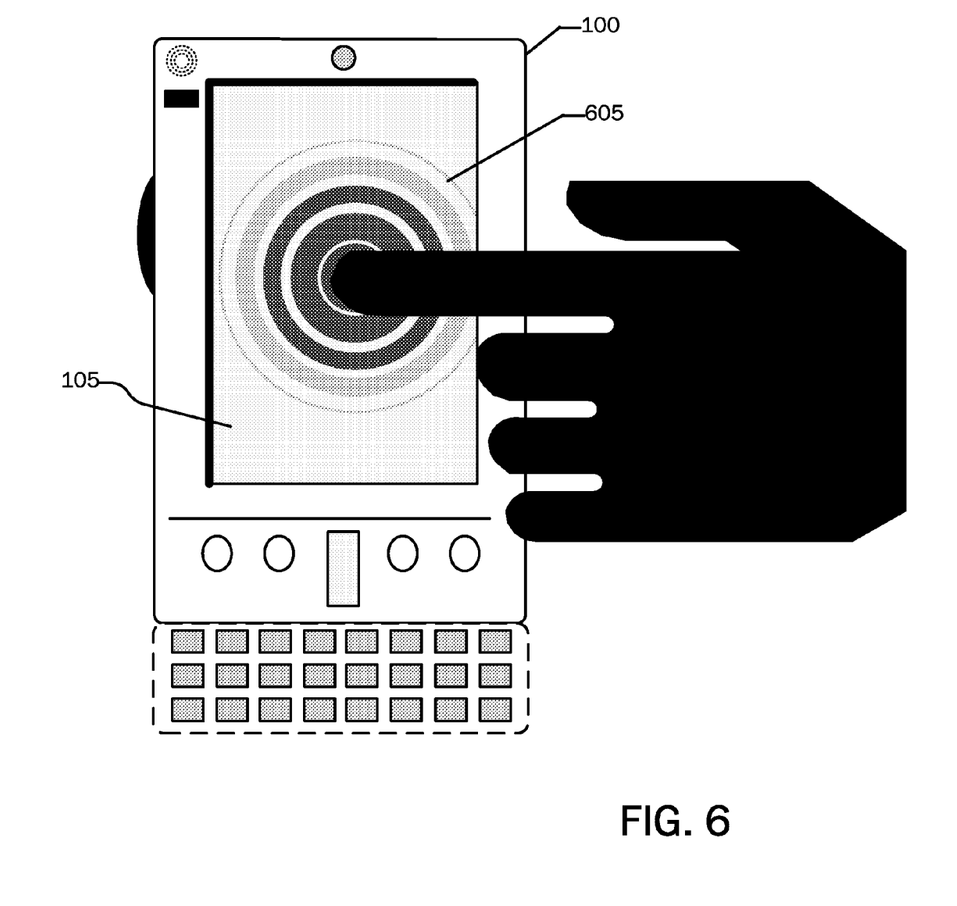
FIG. 6 is an illustration of an example volume meter display provided by a touch-anywhere-to-speak module.

At operation 431, while the spoken utterance is being received 430, visual feedback of a measured sound level of the spoken utterance may be displayed on the screen. Referring to FIG. 6 in association with FIG. 4, the feedback may be a volume meter 605. According to an embodiment, the volume meter may be rendered as a series of concentric rings emanating out from a touched position as more volume is detected. According to another embodiment, the concentric rings may change color or shading as volume increases. As illustrated in FIG. 6, an example volume meter 605 is displayed on the screen 105 of a mobile computing device 100 reflecting the volume at which the user is speaking. In this example, the volume at which the user is speaking is shown as being detected at a volume level of three out of a maximum of five levels. If the user speaks louder, the next outer ring may change color or shading to let the user know that the volume of his voice has risen. If the user speaks more softly, the number of colored or shaded rings may decrease to let the user know that the volume of his voice has decreased. The animated display is a way of providing visual feedback and aiding in self-correction.

Referring still to FIG. 4, after the user finishes his/her spoken utterance, at operation 435, an indication to end the listening mode is received. As described previously, according to one embodiment, a press-and-hold interaction model may be used where a user touches the screen 105 to activate listening, keeps his/her finger (or other mechanism utilized for the touch screen interface) on the screen while he/she is providing audible input, and then releases his/her finger or other touch mechanism to indicate for the TATS module 265 to deactivate listening. According to another embodiment, a press-and-release interaction model may be used, where the indication to end listening may be via an indication of a subsequent touch. According to another embodiment, detected silence for a given amount of time may be the indication for the listening mechanism to end listening. As should be appreciated, other methods may be used to indicate that the user is through speaking and for the application to exit listening mode.

Once an indication is received to end listening, at operation 440, the listening mechanism is deactivated, and the speech recognition module 330 no longer receives audible input until it receives an indication to activate the listening mechanism again. At operation 445, the TATS module 265 acknowledges that it has received an indication to deactivate listening and subsequently the listening mechanism has been deactivated. According to an embodiment, the acknowledgement may be visual feedback, audible feedback, tactile feedback, or a combination of the three. According to one embodiment, operations 440 and 445 may occur simultaneously. According to another embodiment, operation 440 may occur before operation 445. According to another embodiment, operation 440 may occur after operation 445.

At operation 450, the received audible input is sent to a speech recognition module, where it may be translated into digital data, analyzed, and determined what the user has said. The speech recognition module 330 may be embedded on the mobile computing device 100 or located remotely and accessed via a wireless connection to a server. Once the speech is recognized, it may be sent to an action module 340 to perform the recognized intended function of the user. For example, if it was determined that the user spoke, "Movie listings; Dallas, Tex." The action module 340 may send the data to a search engine via a wireless connection to retrieve current movie listing information in the Dallas, Tex. area. At operation 455, the retrieved data may then be sent to the user and displayed on the screen 105 of the mobile computing device. According to an embodiment, the retrieved data may require the utilization of other mobile applications. For example, for searching movie listings, to retrieve the given data, a browser application may need to be enabled. The method ends at operation 460.

Figure 7:
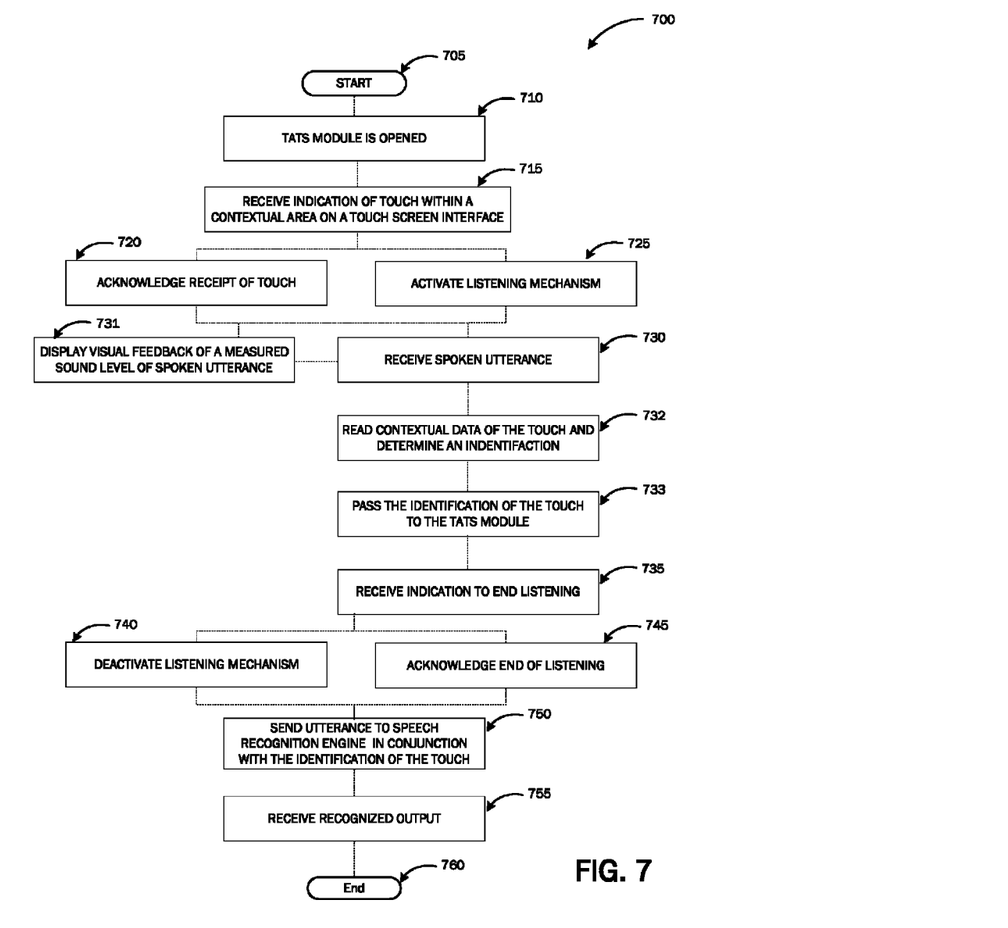
FIG. 7 is a logical flow diagram illustrating a method for engaging the listening mechanism in speech recognition interaction utilizing a touch-anywhere-to-speak module in conjunction with identifying and utilizing contextual data of a touch.

As briefly described earlier, an embodiment of the present invention includes utilizing context sensitive information of the visual interface in addition to open-ended speech commands to help a user complete an array of tasks. FIG. 7 is a logical flow diagram illustrating a method for providing a touch-anywhere-to-speak (TATS) module 265 for engaging the listening mechanism in speech recognition interaction on a mobile computing device 100 wherein a context of the screen where a user has touched may be identified and utilized in conjunction with received audible input.

According to an embodiment, the TATS module 265 may be operative to utilize the data associated with a touch to not only engage the listening mechanism of a speech recognition module 330, but also to engage the listening mechanism within the context of a location or other contextual data that is being touched. Based on the context of the screen 105 of the mobile device 100, and/or the location on the screen 105 where a user touches, the TATS module 265 may determine the context of the user's speech input. Accordingly, the user is provided more targeted information. For example, if a user is viewing a map on his mobile computing device 100, and he touches on a specific area of the map interface and speaks, "coffee", the TATS module 265 may receive the spoken input, "coffee", as well as the context-aware location on the map interface where the user touched the touch screen to retrieve information relevant to coffee and the location specified by the touched area of the map interface. If the user is viewing the same map as in the previous example and speaks "coffee," but touches on a different spot on the map interface, the returned results may be different because the contextual location input has changed. Implementing contextual visual data with spoken data may enable a vast array of possible applications. For example, speaking an instructional command (e.g., "zoom in") while touching on a map interface may produce different results than speaking an utterance intended as a search query.

Referring then to FIG. 7, the method 700 begins at start operation 705 and proceeds to operation 710 where the TATS module 265 is selected and opened by a user. A user may open the TATS module 265 via known input methods, for example, touching on an icon or text string representing the TATS module 265 on the screen 105 of a mobile computing device 100.

After the TATS module 265 is opened, the method proceeds to operation 715 where the TATS module receives an indication of a touch within a contextual area of the touch screen 105 of a mobile computing device 100. As should be appreciated, a touch may be a touch of a user's finger or by means of a device, such as a stylus. According to embodiments of the invention, the received touch is the method by which the listening mode is enabled in speech recognition interaction. Embodiments of the present invention enable a user to touch within a contextual area on the touch sensitive screen 105 of the device 100 to indicate to the speech recognition module to begin listening for audible input.

According to an embodiment, the touch may be a component of a press-and-hold interaction model, where a user touches the screen 105 to activate listening, keeps his/her finger (or other mechanism utilized for the touch screen interface) on the contextual area of the screen while he/she is providing audible input, and then releases his/her finger or other touch mechanism to deactivate listening. According to another embodiment, a touch may be a press-and-release interaction model, which like in the previous model, a user touches the contextual area of the screen 105 to activate listening; however, upon releasing his/her finger or other touch mechanism, the speech recognition application 330 remains in listening mode. The listening mechanism may be deactivated via an indication of a subsequent touch, if silence is determined for a given amount of time, or via another method by which an indication of end of speech is detectable by a given application.

After an indication of a touch is received by the TATS module 265, at operation 720, feedback may be given to acknowledge the receipt of the touch. According to an embodiment, the feedback 505 may be visual feedback (e.g., animated display on screen 105), audible feedback (e.g., played audible tone through speaker 130), tactile feedback (e.g., vibration), or a combination of the three. According to an embodiment, the visual feedback 505 may indicate where on the screen 105 the user has touched. For example, referring back to FIG. 5, an image 505 may be displayed on the screen 105 to alert the user that an indication of a touch has been received in the location where the image is displayed. The feedback 505 may alert the user that the TATS module 265 has received a touch input, and accordingly, the listening mechanism has been activated as shown at operation 725 as illustrated in FIG. 7. According to one embodiment, the TATS module 265 may send feedback acknowledging the receipt of a touch to the user (operation 720) and activate the listening mechanism (operation 725) simultaneously. According to another embodiment, operation 720 may occur before operation 725. According to another embodiment, operation 725 may occur before operation 720.

Once the listening mechanism is activated, the speech recognition module 330 is ready to receive audible input from the user. At operation 730, the user may speak, and his/her spoken utterance may be received by the listening mechanism. As should be appreciated by those skilled in the art, speech recognition is a known technology that will not be discussed at length herein.

At operation 731, while the spoken utterance is being received 730, as described previously with reference to operation 431 in FIG. 4, visual feedback 605 of a measured sound level of the spoken utterance may be displayed on the screen 105 rendered as centered around an area on the touch screen 105 at which the touch is received.

Continuing on to operation 732, the TATS module 265 may identify the contextual data of the touch and determine an identification of the touch in association with the identified contextual data. At operation 733, the identification of the touch may be passed to the TATS module 265. For example, if a user is viewing a map of a city, he/she may touch a specific area of the map and speak an utterance. The specific area of the map displayed on the screen interface where the user touched may be read and identified as a specific latitude and longitude within which to utilize in conjunction with received spoken data to perform a recognized intended function by the user.

At operation 735, an indication to end the listening mode is received. Accordingly, at operation 740, the listening mechanism is deactivated and at operation 745, an acknowledgement is given that the listening mechanism has been deactivated.

At operation 750, the received audible input is sent to a speech recognition module, where it may be translated into digital data, analyzed in conjunction with the identified contextual data of the touch, and determined what the user has said. The speech recognition module 330 may be embedded on the mobile computing device 100 or located remotely and accessed via a wireless connection to a server. Once the speech is recognized, it may be sent to an action module 340 to perform the recognized intended function of the user. According to an embodiment, the identification and utilization of the contextual data of the touch may occur at various stages in the process, and not necessarily at operation 750.

At operation 755, the retrieved data may then be sent to the user and displayed on the screen 105 of the mobile computing device. According to an embodiment, the retrieved data may require the utilization of other mobile applications. The method ends at operation 760.

According to an embodiment, a press-and-hold interaction may enable certain speech recognition functions; while alternately, a press-and-release interaction may enable other functionalities. For example, if a user touches his/her finger on the screen 105 of his mobile device 100 and then moves his/her finger off of the screen 105, the TATS module 265 may enable the listening mechanism for speech recognition interaction. However, if he touches his/her finger on the screen 105 of his mobile device and leaves his/her finger on the screen 105, the TATS module 265 may enable the listening mechanism for speech recognition interaction within the context of the touch. According to this example, a press-and-hold action makes the distinction for the TATS module 265 to apply the context of the visual interface in addition to the audible input. It should be appreciated that other methods may exist for distinguishing between intended interaction applications.

Although the invention has been described in connection with various embodiments, those of ordinary skill in the art will understand that many modifications may be made thereto within the scope of the claims that follow.

We claim:

1. A method for providing input functionality for a speech recognition interaction module, comprising:
   receiving an indication of a touch anywhere on a touch screen interface of a mobile computing device;
   upon reception of the indication of the touch anywhere on the touch screen interface, activating a listening mechanism of a speech recognition module; and
   displaying dynamic visual feedback of a measured sound level of a spoken utterance received by the speech recognition module, wherein the displayed dynamic visual feedback is rendered as centered around an area on the touch screen at which the touch is received.

2. The method of claim 1, further comprising
   generating an acknowledgment in response to receiving the indication of the touch anywhere on the touch screen interface of the mobile computing device.

3. The method of claim 1, wherein receiving the indication of the touch anywhere on the touch screen interface of the mobile computing device includes receiving the indication of the touch and hold anywhere on the touch screen interface of the mobile computing device.

4. The method of claim 1, wherein activating the listening mechanism of the speech recognition module comprises:
   determining if the touch screen interface has received the touch; and
   activating the listening mechanism.

5. The method of claim 2, wherein acknowledging reception of the indication of the touch anywhere on the touch screen interface is in the form of visual feedback.

6. The method of claim 2, wherein acknowledging reception of the indication of the touch anywhere on the touch screen interface is in the form of audible feedback.

7. The method of claim 2, wherein acknowledging reception of the indication of a the touch anywhere on the touch screen interface is in the form of tactile feedback.

8. The method of claim 2, wherein acknowledging reception of the indication of the touch anywhere on the touch screen interface is in the form of a combination of audible, visual, and/or tactile feedback.

9. A method for providing input functionality for a speech recognition interaction module, comprising:
   receiving an indication of a touch within a contextual area on a touch screen interface of a mobile computing device; and upon reception of the indication of the touch within the contextual area on the touch screen interface:
  identifying a contextual data of the touch and determining an identification of the touch in association with the identified contextual data;
  passing the identification of the touch to one or more software applications;
  activating a listening mechanism of a speech recognition module;
  receiving a spoken utterance;
  utilizing the identification of the touch in association with the identified contextual data, and causing a performance of a functionality of the one or more software applications based on the identified contextual data; and
  displaying dynamic visual feedback of a measured sound level of the spoken utterance received by the speech recognition module, wherein the displayed dynamic visual feedback is rendered as centered around an area on the touch screen at which the touch within the contextual area is received.

10. The method of claim 9, further comprising generating an acknowledgment in response to receiving the indication of the touch within the contextual area on the touch screen interface of the mobile computing device.

11. The method of claim 10, wherein acknowledging reception of indication of the touch within the contextual area on the touch screen interface may be in the form of audible feedback, visual feedback, tactile feedback, or any combination of the three.

12. The method of claim 9 wherein the step of receiving the indication of the touch within the contextual area on the touch screen interface of the mobile computing device includes receiving the indication of the touch and hold reception within the contextual area on the touch screen interface on the touch screen interface of the mobile computing device.

13. A computer readable storage medium containing computer executable instructions which when executed by a computer perform a method for providing input functionality for a speech recognition interaction module, comprising:
  receiving an indication of a touch anywhere on a touch screen interface of a mobile computing device;
  activating a listening mechanism of a speech recognition module;
  generating an acknowledgment in response to receiving the indication of the touch anywhere on the touch screen interface of the mobile computing device; and
  displaying dynamic visual feedback of a measured sound level of a spoken utterance received by the speech recognition module, wherein the displayed dynamic visual feedback is rendered as centered around an area on the touch screen at which the touch within a contextual area is received.

14. The computer readable storage medium of claim 13 wherein the step of receiving the indication of the touch anywhere on the touch screen interface of the mobile computing device includes receiving the indication of the touch and hold anywhere on the touch screen interface of the mobile computing device.

15. The computer readable storage medium of claim 13, wherein receiving the indication of the touch anywhere on the touch screen interface of the mobile computing device includes receiving the indication of the touch within the contextual area on the touch screen interface.

16. The computer readable storage medium of claim 15, wherein receiving the indication of the touch within the contextual area on the touch screen interface includes receiving the touch on a portion of the touch screen interface where a given information is displayed by a software application operated via the mobile computing device.

17. The computer readable storage medium of claim 16, further comprising identifying a contextual data associated with the contextual area on the touch screen interface.

18. The computer readable storage medium of claim 17, further comprising receiving the spoken utterance via the activated listening mechanism of the speech recognition module related to the identified contextual data.

19. The computer readable storage medium of claim 18, further comprising passing an instruction representing the received spoken utterance to one or more software applications operative to perform a function related to the identified contextual data.

20. The computer readable storage medium of claim 19, further comprising causing the software application operative to perform the function related to the identified contextual data and to display a result of the performed function on the touch screen interface.

* * * * *